(12) United States Patent
Greene et al.

(10) Patent No.: US 6,719,257 B1
(45) Date of Patent: Apr. 13, 2004

(54) ADJUSTABLE STOP FOR TELESCOPING TUBES

(76) Inventors: Tim L. Greene, 1113 Knollwood Dr., Safety Harbor, FL (US) 34695; Tracy R. Hoeft, 2853 Gloria Ct., Clearwater, FL (US) 33761

( * ) Notice: Subject to any disclaimer, the term of this patent is extended or adjusted under 35 U.S.C. 154(b) by 0 days.

(21) Appl. No.: 10/339,452

(22) Filed: Jan. 9, 2003

(51) Int. Cl.[7] ............................ F16M 11/00; F16D 1/12
(52) U.S. Cl. ........................ 248/411; 248/161; 403/104
(58) Field of Search ............................ 248/411, 159, 248/161, 407, 408, 410, 125.8, 125.1, 125.3, 412, 413; 403/104, 109.1; 84/421

(56) References Cited

U.S. PATENT DOCUMENTS

| | | | | |
|---|---|---|---|---|
| 1,970,624 A | * | 8/1934 | Recker | 248/412 |
| 2,623,573 A | * | 12/1952 | Di Gaetano | 280/283 |
| 2,902,592 A | * | 9/1959 | Cole et al. | 248/411 |
| 3,103,375 A | * | 9/1963 | McMullin | 248/188.5 |
| 3,554,585 A | * | 1/1971 | Sorenson | 248/408 |
| 3,604,734 A | * | 9/1971 | Friedman et al. | 403/104 |
| 3,845,926 A | * | 11/1974 | Wahls | 248/162.1 |
| 3,856,253 A | | 12/1974 | Seebinger | |
| 4,140,415 A | * | 2/1979 | Koyamato | 403/104 |
| 4,185,808 A | | 1/1980 | Donohoe et al. | |
| 4,385,849 A | * | 5/1983 | Crain | 403/109.3 |
| 4,606,525 A | | 8/1986 | Lombardi | |
| 4,818,135 A | * | 4/1989 | Desjardins | 403/104 |
| 5,011,104 A | * | 4/1991 | Fang | 403/104 |
| 5,011,174 A | * | 4/1991 | Ross-Clunis | 248/161 |
| 5,022,617 A | | 6/1991 | Henderson | |
| 5,566,911 A | | 10/1996 | Hoshino | |
| 5,772,162 A | * | 6/1998 | Lin | 248/121 |
| 6,075,190 A | | 6/2000 | Mosser et al. | |
| 6,082,680 A | * | 7/2000 | Woodward et al. | 248/682 |
| 6,138,973 A | * | 10/2000 | Woodward | 248/423 |
| 6,162,978 A | | 12/2000 | Chang | |

FOREIGN PATENT DOCUMENTS

| | | | |
|---|---|---|---|
| DE | 674213 | * | 3/1939 |
| DE | 1429403 | * | 1/1969 |
| NO | 72462 | * | 8/1947 |

* cited by examiner

*Primary Examiner*—Anita King
(74) *Attorney, Agent, or Firm*—John V. Stewart

(57) ABSTRACT

An adjustable stop attached to the smaller of two nested telescoping tubes. The stop is in the form of a sleeve that is axially and rotationally adjustable on the smaller tube. The sleeve is smaller in diameter than the inner diameter of the larger tube, and it has a detent for a pin extending inward from a tube clamp on the larger tube. The detent receives and releases the pin in both axial directions. This provides a detent at a selected relative extension and rotation position of the tubes, yet it also allows the smaller tube to fully retract into the larger tube. The tube clamp is used to fix the tubes at the detent position. The tube clamp is used conventionally to set a desired detent position.

14 Claims, 5 Drawing Sheets

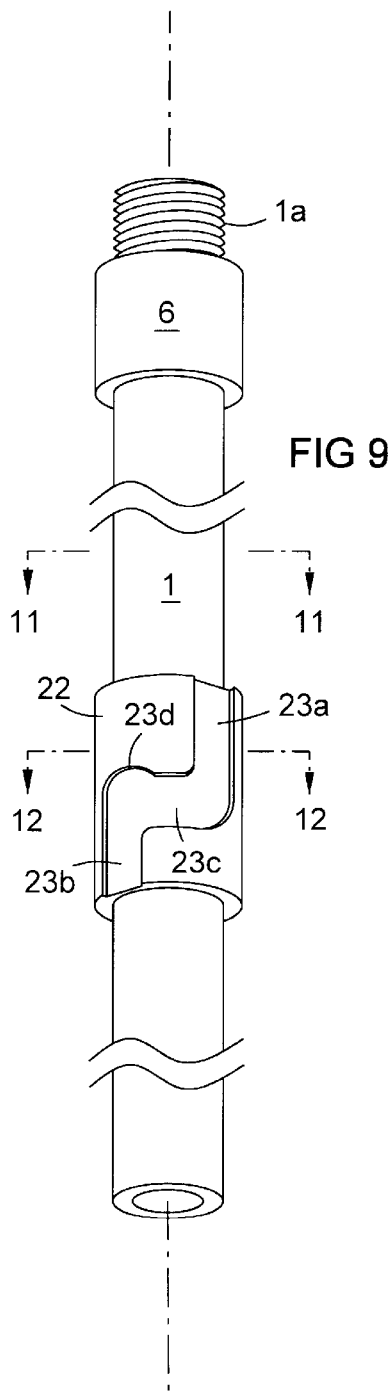
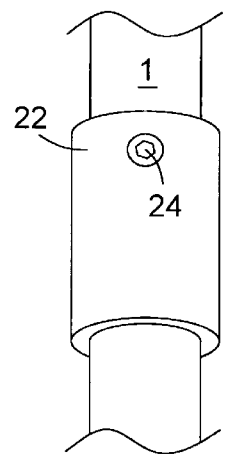
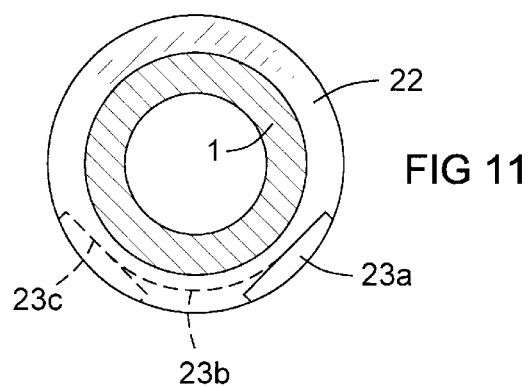
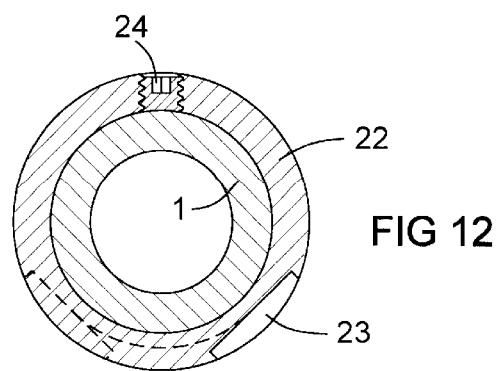
FIG 9
FIG 10
FIG 11
FIG 12

ADJUSTABLE STOP FOR TELESCOPING TUBES

BACKGROUND OF THE INVENTION

1. Field of the Invention

This invention relates to telescoping tubes used as support structures, especially as used in a support arm or standard for portable equipment such as cameras, musical cymbals, drums, and the like.

2. Description of Prior Art

Various support devices are utilized to support portable equipment such as musical drums or cymbals, microphones, speaker enclosures, stage lighting, cameras, and the like. Such support devices usually have an extentable standard or arm constructed as a plurality of interrelated structural members, with means for attaching the equipment to the structural members, and means for positioning and clamping the structural members in positions relative to one another. Generally, the structural members are nested hollow tubes, and two or more tubes are designed to collapse into one another for ease of storage or transport. Some type of metal fitting or clamp is usually attached to one end of a structural member to attach the supported equipment. The opposite end of the structural member is attached to other structural members in the support system by means of additional fittings of clamps. The fittings or clamps in combination with the interrelated structural members allow the musical instrument or equipment to be located in the desired vertical, horizontal, and angular position for use. The support systems are generally disassembled for transport or storage and reassembled for setup and reuse.

In conventional support systems, the relationship of the telescoping members is not maintained when disassembled, and the supported instrument or equipment must be repositioned each time in a tedious trial and error process.

One solution is the use of so-called "memory locks". U.S. Pat. No. 5,566,911 illustrates a typical example [see FIG. 5, #25]. The memory lock is a sleeve or collar fixed on a support tube in a desired location by means of a clamping screw. When the tube with memory lock is inserted into the top of a second, larger diameter tube, the memory lock hits the upper surface of the second tube and prevents further insertion. This provides a repeatable extension position for reassembly of the support tubes. However, a major drawback is that the support tubes with memory locks cannot be collapsed into one another for storage or transport, but must be disassembled into numerous individual tubes. The individual tubes are cumbersome to store or carry, take up more space than telescoping tubes, and expose the full tube surface to damage from other equipment during transport. Typically, several different independent support structures or stands are used in a single setup to support various pieces of equipment. This further complicates re-assembly, since the correct tubes must be re-matched to the appropriate support stand for correct re-assembly.

Another solution is described in U.S. Pat. No. 4,185,808. See especially FIGS. 3 and 4, where a first connector part 36 is clamped onto the inner tube. The first connector part 36 has a key 50 that slides into a slot 70 on a second connector part 38 on the outer tube. This indexes the tubes at a repeatable rotational position in addition to a repeatable extension position. However, as with U.S. Pat. No. 5,566,911 above, the inner tube cannot be retracted into the outer tube, so the disadvantages mentioned above apply.

Another solution is described in U.S. Pat. No. 4,606,525. In this invention, an adjustable flexible strand is fixed lengthwise to the inside of the various tubular sections. When the sections are fully extended, the strand is pulled tight, blocking further extension and thus providing an extension reference. The sections can be telescoped into one another since the strand is inside of the tubing and is flexible. A disadvantage of this solution is the lack of positive rotational positioning. The extended strand provides a height reference, but does not address the rotational position of one tube relative to the other, thus not fully addressing the desire for repeatable positioning.

Thus, there is a need for an improved method for repeatable positioning of equipment supports, such as musical instrument supports, that overcomes the current limitations of the art, examples of which include:

U.S. Pat. No. 6,162,978 "Adjusting Structure for Musical Instrument Supporters"
U.S. Pat. No. 6,075,190 "Drum Holder"
U.S. Pat. No. 5,566,911 "Stand for Drum and Cymbal"
U.S. Pat. No. 4,606,525 "Height Adjustment of Music Stand"
U.S. Pat. No. 4,185,808 "Connector Hardware for Percussive Instruments"

SUMMARY OF THE INVENTION

A general object of this invention to provide a means for repeatably positioning telescoping standards on equipment support stands for ease of setup and use.

One object is to provide means for locating nested tubular members in specific extension positions relative to one another that incorporates the ability to easily return to the same relative extension positions after disassembly and reassembly.

A second object is to provide means for locating nested tubular members in specific rotational positions relative to one another that incorporates the ability to easily return to the same relative rotational positions after disassembly and reassembly.

A third object is to provide such repeatable positioning means while retaining the ability to telescope one tubular member into another for storage or transport without removing the repositioning device.

A fourth object is to provide means to easily set a desired repeatable extension and rotational position with minimal trial and error.

A fifth object is to integrate a repeatable positioning system internally to telescoping tube clamps for a satisfactory appearance and ease of use.

These objectives are met in an adjustable stop attached to the smaller of two nested telescoping tubes. The stop is axially and rotationally adjustable on the smaller tube. The stop is smaller in diameter than the inner diameter of the larger tube. The stop has a detent for a pin extending inward from a tube clamp on the larger tube. The detent receives and releases the pin in both axial directions. This provides a stop for both the relative extension and rotational positions of the tubes, and also allows the smaller tube to retract into the larger tube. The tube clamp is used to fix the tubes at the detent position. The tube clamp is used conventionally to initially establish or readjust a desired detent position.

BRIEF DESCRIPTION OF THE DRAWINGS

FIG. 9 is a perspective front view of an inner telescoping tube with an adjustable stop sleeve in a second embodiment 22 and a retraction shoulder 6.

FIG. 10 is a perspective back view of the stop sleeve of FIG. 9.

FIG. 11 is a top sectional view taken along section line 11—11 of FIG. 9.

FIG. 12 is a top sectional view taken along section line 12—12 of FIG. 9.

REFERENCE NUMBERS

Figure 1:
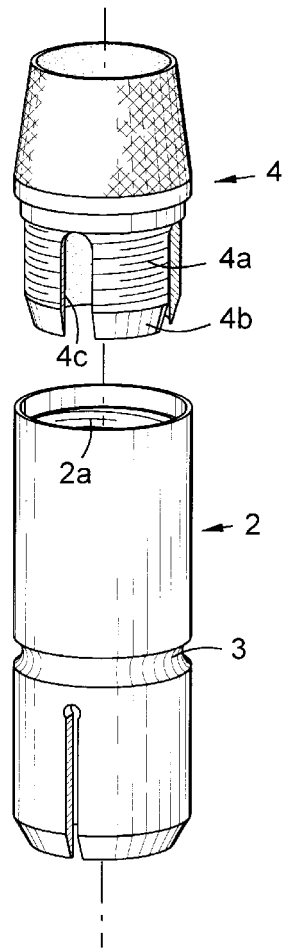
FIG. 1 is an exploded perspective front view of an adjustable stop sleeve for an inner telescoping tube, with a tightening collar.

1. Inner nested structural member or tube
1a. Attachment means for supported equipment
2. Adjustable sleeve with annular groove
2a. Threads on adjustable sleeve 2
2b. Tapered receiver of sleeve 2 to compress tapered end of collar 4
3. Annular groove on outer surface of sleeve
3a. Rotation detent in annular groove
4. Threaded collar for fixing sleeve 2 to inner structural member
4a. Threads on sleeve 2
4b. Tapered end on sleeve 2
4c. Compression slot on sleeve 2
6. Secondary sleeve for clamping the inner tube in retracted position
10. Outer nested structural member or tube
11. Tube clamp
12. Clamp tightening knob
13. Spring loaded rounded-end pin extending inward
14. Spring
15. Spring retaining screw
22. Sleeve with angular slot type detent, attached to inner structural member
23. Angular slot on outer surface of sleeve
23a. First axially oriented portion of angular slot on sleeve
23b. Second axially oriented portion of angular slot on sleeve
23c. Rotationally oriented portion of angular slot on sleeve
23d. Rotational detent on rotationally oriented portion of angular slot on sleeve
24. Setscrew on sleeve
33. Fixed pin extending inward

TERMINOLOGY

Nested tubes—Telescoping support poles are often formed as a series of two or more sequentially smaller tubes nested within each other. However, it is understood that the innermost element of a series of nested telescoping sections may be solid, rather than tubular, within the scope of the invention.

DETAILED DESCRIPTION

Figure 2:
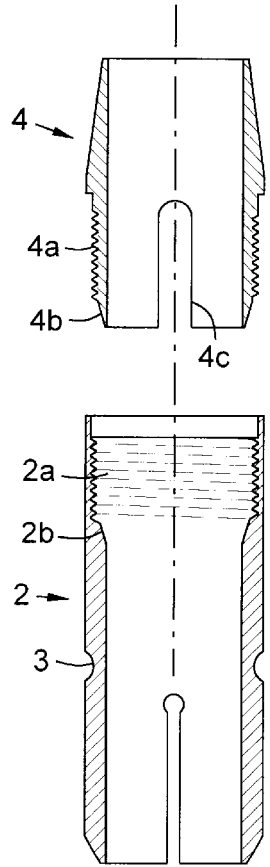
FIG. 2 is a front exploded sectional view of FIG. 1.
Figure 3:
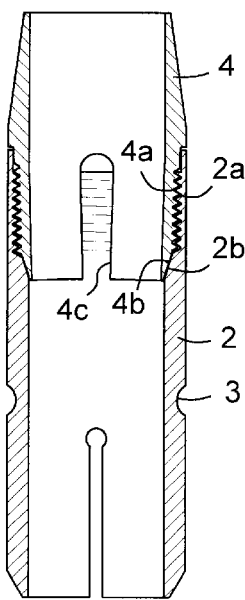
FIG. 3 is a front sectional view of FIG. 1 with the tightening collar threaded into the stop sleeve.

In a preferred embodiment, a stop sleeve 2 is releasably fixed in a desired location on the inner tube 1 of a pair of nested telescoping tubes—an inner tube 1, and an outer tube 10. Preferably a threaded collar 4 as shown in FIGS. 1–3 is provided with external threads 4a that mate with internal threads 2a in the sleeve. The collar has a tapered end 4b that meets a tapered receiving portion 2b in the sleeve. This causes the collar to squeeze the inner tube when it is tightened into the sleeve, thus fixing the sleeve at a desired position on the inner tube. The collar preferably has knurling as shown for finger friction, and/or it may have flat faces for a wrench. Alternately, the stop sleeve may be fixed in position with a setscrew or with other means known in the art. The stop sleeve and collar are preferably made of a semi-flexible material that allows elastic deformation of the collar to grip the inner tube, and allows elastic deformation of the lower end of the sleeve under clamping pressure, as later described, to grip the inner tube.

The stop sleeve 2 has a detent such as a slot, locating hole, or indention to receive a pin 13 attached to the outer tube for positioning the outer tube relative to the inner tube. The outer tube is sized to slide over the outer surface of the stop sleeve, and has a tube clamp 11 for fixing the inner tube relative to the outer tube. The pin 13 is incorporated in an otherwise conventional tube clamp 11. The pin is releasable from the stop sleeve in either axial direction, or at least in the axial direction that allows retraction of the inner tube into the outer tube for storage. When the inner tube is extended for re-use, the pin engages the detent on the stop sleeve for easy positioning at the previous relative location. Several sequentially nested tubular sections can be assembled in such a manner to achieve desired height and position requirements.

Figure 4:
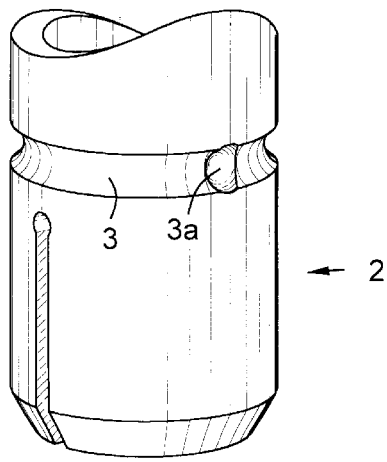
FIG. 4 is an enlarged perspective view of an adjustable stop sleeve 2 with optional rotation detent 3a formed as a ball-end countersink.
Figure 5:
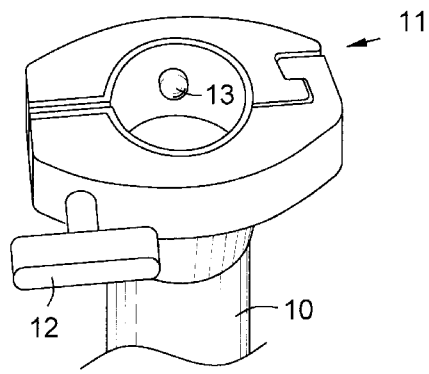
FIG. 5 is a top back perspective view of a tube clamp with spring-loaded rounded-end pin.
Figure 6:
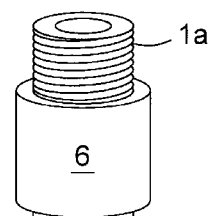
FIG. 6 is a perspective view of an inner telescoping tube 1 positioned by stop sleeve 2 in tube clamp 11 and in outer tube 10, also showing a retraction shoulder 6.
Figure 7:
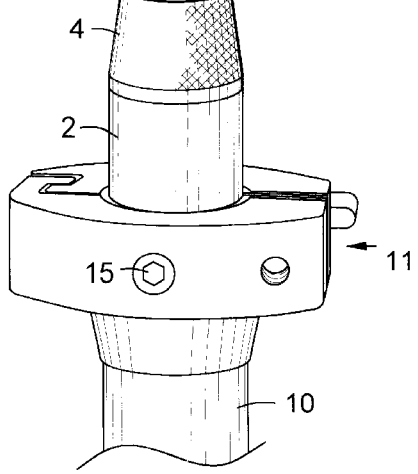
FIG. 7 is a sectional view of a stop sleeve 2 installed on an inner tube 1, the sleeve positioned by pin 13 for clamping by tube clamp 11.
Figure 7:
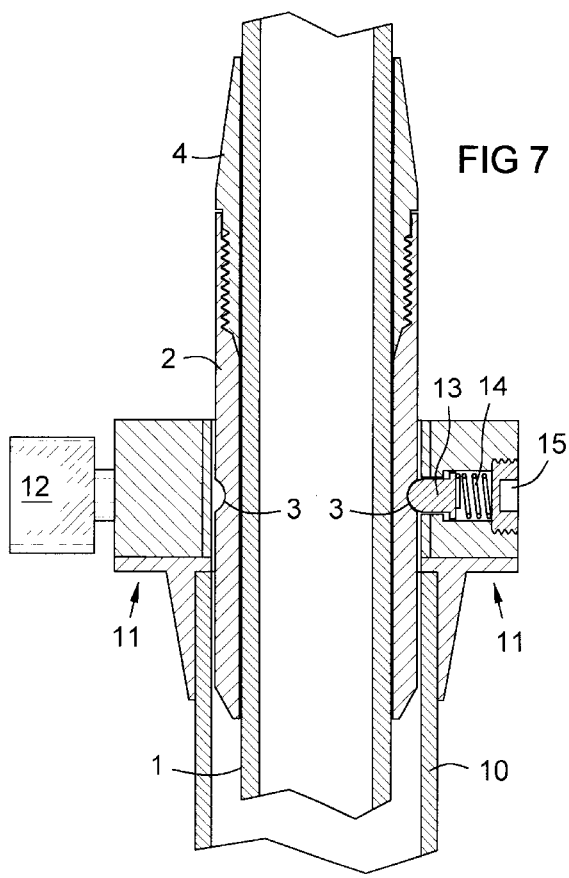
Figure 8:
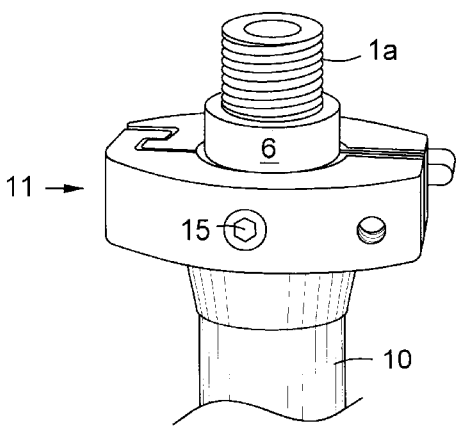
FIG. 8 is a perspective view of the assembly of FIG. 6 with the inner tube retracted into the outer tube for storage.
Figure 13:
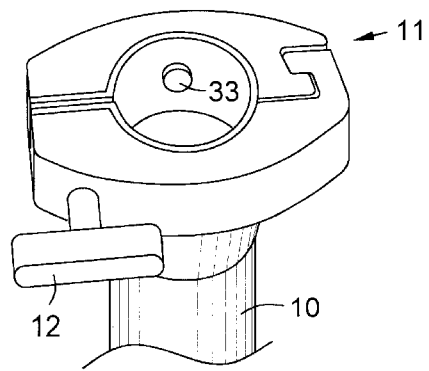
FIG. 13 is a top back perspective view of a tube clamp with a fixed locating pin 33.

In a preferred embodiment shown in FIGS. 1–8, the detent is provided by an annular groove 3 on the stop sleeve. The groove is preferably a toric surface as shown. A ball-end countersink 3a is preferably provided on the groove as shown in FIG. 4. This provides a rotational detent for the pin. In the embodiment of FIGS. 1–8, the pin is spring-loaded as shown in FIG. 7. It preferably has a rounded end so it will be pushed out of the rotational detent by rotary or axial motion of the sleeve relative to the pin, and it will be pushed out of the annular groove by axial motion of the sleeve relative to the pin. The depth of each part of the detent should be less than the radius of the inner end of the pin.

Optionally, a secondary sleeve 6 may be provided at the distal end of the inner tube for the purpose of clamping the inner tube in a retracted position for transport. The secondary sleeve has the same diameter as the stop sleeve, so it can be clamped by the tube clamp 11. The secondary sleeve may optionally have an axially oriented slot (not shown) to receive the pin for the purpose of preserving the desired rotational position of the tubes for faster set-up.

Equipment attachment means la is shown symbolically as pipe threads. However, this represents any conventional attachment means including, but not limited to, thread, bolt, or clamp means. The inner tube 1 may extend above the secondary sleeve 6, and have one or more attachment points and hardware for equipment above the secondary sleeve.

To operate this device, the collar 4 is unscrewed partially from the sleeve 2 to release the grip of the collar on the inner tube. The sleeve is then positioned to engage the pin 13 in the detent. The inner tube is then moved to its desired extension and rotational position, sliding within the sleeve. The clamp is then tightened on the sleeve, compressing the lower portion of the sleeve slightly and squeezing it against the inner tube. This holds the inner tube in position. The collar is then tightened into the sleeve, fixing the sleeve in the desired detent position on the inner tube. Subsequently the inner tube can be unclamped and retracted into the outer tube for storage, or optionally removed from the outer tube, then returned to the same extension and rotational position for clamping on the next set-up without readjustment by moving the sleeve to the detent. This quickly and easily repeats the previously set position.

An alternate embodiment is shown in FIGS. 9–16. A stop sleeve 22 is shown with a setscrew 24 for fixing the sleeve to an inner tube 1. Alternate fixing means may be used as described herein or as known in the art. A detent is provided by an angular slot 23 on the stop sleeve. The slot is preferably formed generally as shown, having a first axially oriented portion 23a open to one end of the stop sleeve, a second axially oriented portion 23b open to the other end of the stop sleeve, and a rotationally oriented portion 23c connecting the first and second axially oriented portions. Portion 23c preferably has a concave wall portion 23d as shown in FIG. 9 to retain the pin rotationally.

The pin 33 in this embodiment is preferably fixed, since there is no need for spring loading, and it preferably has a flat end. Although the pin 33 is shown attached to the clamp 11, the engagement direction could be reversed, with the pin on the sleeve 2 and the slot on the clamp 11.

Figure 17:
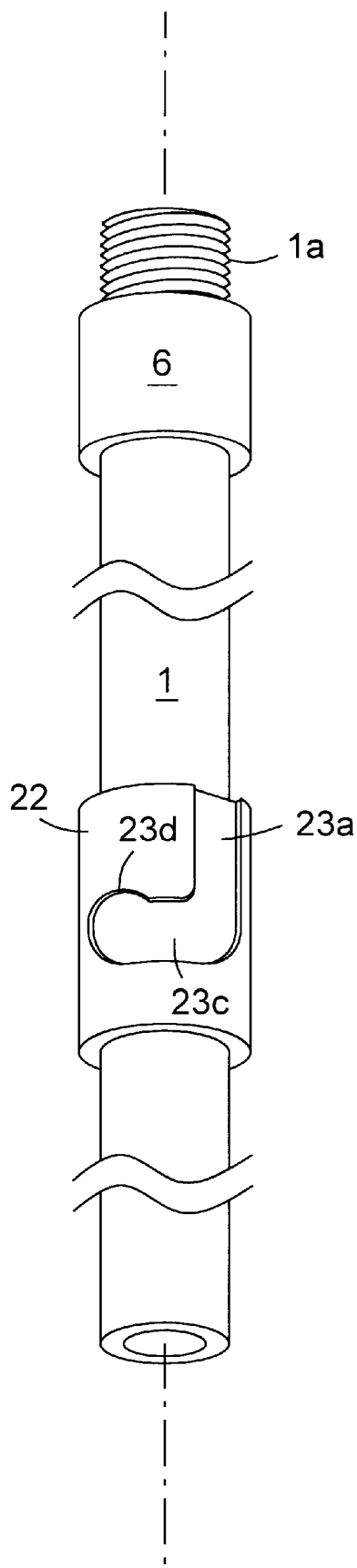
FIG. 17 is a front perspective view of an alternate embodiment of the stop sleeve 22 of FIG. 9.

Alternately, as shown in FIG. 17, the slot 23 may be formed without a second axially oriented portion 23b. This allows the inner tube to retract within the outer tube, but prevents the inner tube from being removed from the outer tube without loosening the setscrew.

Figure 15:
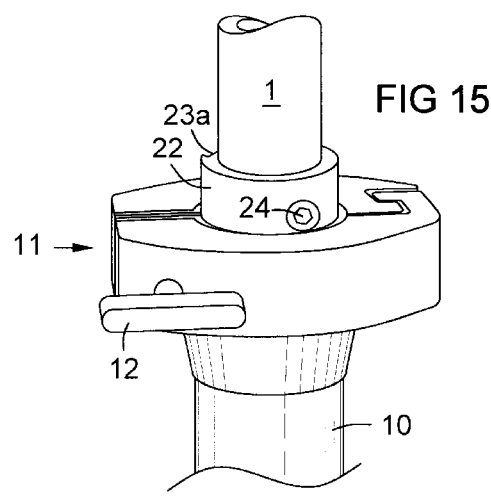
FIG. 15 is a back perspective partial view of FIG. 14, showing accessibility of setscrew 24 for setting the stop sleeve position.
Figure 14:
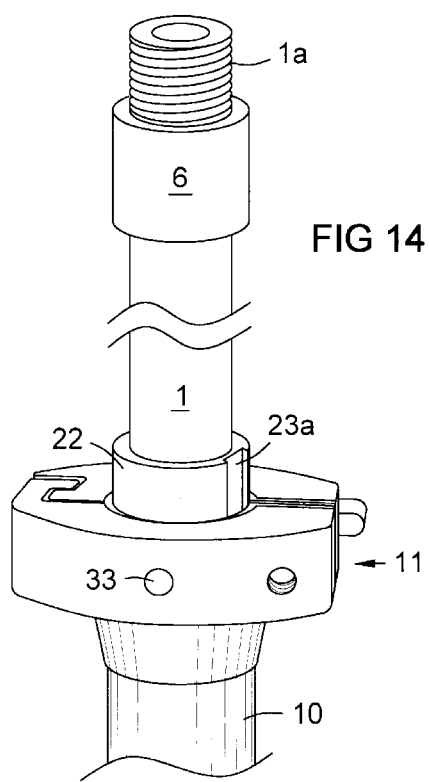
FIG. 14 is a front perspective view of inner tube 1 positioned by a stop sleeve 22 and clamped in outer tube 10.
Figure 16:
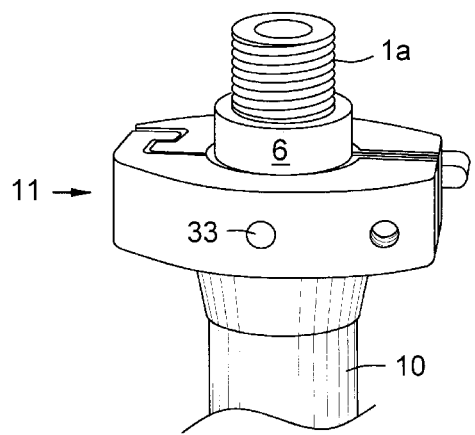
FIG. 16 is a front perspective view of the assembly of FIG. 14 with the inner tube 1 retracted into the outer tube 10 for storage.

To operate the device, setscrew 24 is loosened, and the sleeve 22 is positioned with the pin 33 in the detent. The user sets the position of supported equipment as desired, using tube clamp 11 in a conventional way to tighten the inner tube at the desired extension and rotation. The stop sleeve slides on the inner tube during initial set-up, and remains in the clamp as the inner tube is positioned and clamped. The user then tightens the setscrew 24, which is accessible as seen in FIG. 15. This fixes the stop sleeve 22 onto the inner tube. To collapse the support, the tube clamp is loosened, and the inner tube is retracted into the outer tube. This requires a twist of the inner tube to align the pin with the first axial slot portion 3a. Subsequent set-ups are the reverse of the retraction steps. The pin is moved into the detent, and the tube clamp is tightened. This quickly and easily repeats the previously set position.

Although the present invention has been described herein with respect to preferred embodiments, it will be understood that the foregoing description is intended to be illustrative, not restrictive. Modifications of the present invention will occur to those skilled in the art. All such modifications that fall within the scope of the appended claims are intended to be within the scope and spirit of the present invention.

We claim:

1. An adjustable stop mechanism used in combination with a telescoping pair of structural members comprising an elongated inner member slidably nested within an elongated tubular outer member, the inner member having an outer diameter and an axis; the outer member having an inner diameter, an axis, first and second ends; and a clamp on the first end of the outer member for fixing the inner member at a selectable axial position relative to the outer member; the stop mechanism comprising:

a radial clearance between the outer diameter of the inner member and the inner diameter of the outer member;

a sleeve mounted on the inner member that is axially positionally adjustable on the inner member;

the sleeve fitting within the clearance between the inner and outer members;

an interface between the sleeve and the clamp that releasably detents the sleeve at a predetermined relative position between the sleeve and the clamp during axial slidable movement of the sleeve through the clamp; and the interface receives and releases the sleeve for movement of the sleeve relative to the clamp from and to at least the axial direction of the second end of the outer member;

whereby an axial position detent is provided by the interface at a selected relative position between the inner and outer telescoping structural members, and the sleeve can move axially in the outer member from the detent position toward the second end of the outer member.

2. The adjustable stop mechanism of claim 1 wherein the inner member is rotatable within the outer member, the sleeve is rotatably adjustable on the inner member, and the interface releasably detents the sleeve at a predetermined relative rotational position between the sleeve and the clamp during rotational movement of the sleeve in the clamp.

3. The stop mechanism of claim 2, wherein the interface comprises:

a pin that is mounted and spring-loaded In the clamp for limited radial movement that is urged inward, the pin having an inner end; and an annular groove in the sleeve to partially receive the inner end of the pin, providing a releasable axial detent for the sleeve relative to the clamp.

4. The stop mechanism of claim 3, wherein the sleeve is additionally rotatably adjustable on the inner member, and the detent further comprises a countersink in the annular groove that partially receives the inner end of the pin, providing a releasable rotational detent for the sleeve relative to the clamp.

5. An adjustable stop mechanism used in combination with a telescoping pair of structural members comprising an elongated inner member slidably and rotatably nested within an elongated tubular outer member, the outer member having an inner diameter and an axis, and a clamp on the outer member for fixing the inner member at a selectable position relative to the outer member, the stop mechanism comprising:

a pin on the clamp, the pin having an inner end projecting inward within the inner diameter of the outer member;

a detent on the inner member for releasably retaining the inner end of the pin against at least relative axial movement between the two structural members;

means for receiving the pin to the detent from either axial direction and releasing the pin from the detent to either axial direction; and means for adjusting at least the axial position of the detent on the inner member;

wherein the detent provides a stop for at least the relative extension position of the two telescoping members, and also allows the inner member to retract into the outer member.

6. The stop mechanism of claim 5, wherein the detent additionally releasably retains the inner end of the pin against relative rotational movement between the two structural members, and the detent Is rotationally adjustable on the inner member; wherein the detent provides a stop for both the relative extension and the rotational position of the two telescoping members, and also allows the inner member to retract into the outer member.

7. The stop mechanism of claim 5, wherein the pin is spring-loaded in the clamp for limited radial movement that is urged inward;

and wherein the detent comprises:

a sleeve that is axially adjustably mounted on the inner member; and an annular groove in the sleeve to partially receive the inner end of the pin, providing a releasable axial stop for the sleeve relative to the clamp.

8. The stop mechanism of claim 7, wherein the sleeve is additionally rotatably adjustable on the inner member, and further comprises a countersink In the annular groove to partially receive the inner end of the pin, providing a releasable rotational stop for the sleeve relative to the clamp.

9. The stop mechanism of claim 5 wherein the inner member has a distal end extending from the outer member, wherein the sleeve is generally cylindrical having an outer surface and a distal end oriented toward the distal end of the inner member, and further comprising a slot in the outer surface of the sleeve for receiving the pin, the slot having an axially oriented portion open to the distal end of the sleeve, and a rotationally oriented portion.

10. The stop mechanism of claim 5 wherein the sleeve is generally cylindrical having first and second ends and an outer surface, and further comprising a slot in the outer surface of the sleeve for receiving the pin, the slot having a first axially oriented portion open to the first end of the sleeve, a second axially oriented portion open to the second end of the sleeve, and a rotationally oriented portion connecting the first and second axially oriented portions.

11. An adjustable stop mechanism used in combination with a telescoping pair of structural members comprising an elongated inner member slidably and rotatably nested within an elongated tubular outer member, the outer member having an inner diameter and an axis, and a clamp on the outer member for fixing the inner member at a selectable position relative to the outer member, the stop mechanism comprising:

a sleeve releasably fixed on the inner member at a selectable axial and rotational position;

the sleeve having an outer diameter smaller than the inner diameter of the outer member;

a pin extending generally radially inward from the clamp, having an inner end; and a detent on the sleeve that receives the pin from both axial directions and releases the pin to both axial directions;

wherein the detent provides an adjustable stop for both the relative extension and rotational positions of the two telescoping members, and also allows the inner member to retract into the outer member.

12. The stop mechanism of claim 11, wherein the pin is spring-loaded in the clamp for limited radial movement that is urged inward;

and wherein the detent comprises:

an annular groove in the sleeve to partially receive the inner end of the pin, providing a releasable axial stop for the sleeve relative to the clamp.

13. The stop mechanism of claim 12, wherein the detent further comprises a countersink in the annular groove to partially receive the inner end of the pin, providing a releasable rotational stop for the sleeve relative to the clamp.

14. The stop mechanism of claim 11 wherein the sleeve is generally cylindrical having first and second ends and an outer surface, and further comprising:

a slot in the outer surface of the sleeve having a first portion (3a) open to the first end of the sleeve, a second portion (3b) open to the second end of the sleeve, and a third portion (3c) connecting the first and second slot portions and having a wall portion (3d) that blocks the pin in at least an axial direction.

* * * * *